(12) United States Patent
Omer et al.

(10) Patent No.: US 8,970,691 B2
(45) Date of Patent: Mar. 3, 2015

(54) REMOVAL OF RAYLEIGH SCATTERING FROM IMAGES

(75) Inventors: Ido Omer, Seattle, WA (US); Eyal Ofek, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 503 days.

(21) Appl. No.: 13/219,176

(22) Filed: Aug. 26, 2011

(65) Prior Publication Data
US 2013/0050472 A1  Feb. 28, 2013

(51) Int. Cl.
| | |
|---|---|
| H04N 7/18 | (2006.01) |
| G06T 5/00 | (2006.01) |
| G06T 15/00 | (2011.01) |
| H04N 21/214 | (2011.01) |
| H04N 1/56 | (2006.01) |

(52) U.S. Cl.
CPC ...... *G06T 5/008* (2013.01); *H04N 7/18* (2013.01); *H04N 21/2146* (2013.01); *G06T 2207/10024* (2013.01); *H04N 1/56* (2013.01); *G06T 2207/10032* (2013.01)
USPC ............ 348/135; 345/419; 345/589; 382/167

(58) Field of Classification Search
CPC ............. G04K 9/00; H04N 5/89; H04N 7/18; H04N 9/68; H04N 5/76; H04N 5/225; G02B 5/32; G02B 17/14; G02B 27/22; G06T 15/00; G09G 5/02
USPC .................. 348/135, E07.085, 47, 50, 81, 40, 348/E13.026, 115; 382/106, 284, 103; 359/15, 630, 13, 599; 345/7
See application file for complete search history.

(56) References Cited

U.S. PATENT DOCUMENTS

| | | | |
|---|---|---|---|
| 3,554,105 A | 1/1971 | Dougherty | |
| 6,353,673 B1 | 3/2002 | Shnitser et al. | |
| 7,286,218 B2 | 10/2007 | Tiemeyer et al. | |
| 7,474,334 B1 * | 1/2009 | Patterson ................. | 348/207.99 |
| 7,796,833 B2 * | 9/2010 | Polonskiy et al. ............ | 382/274 |
| 7,804,518 B2 * | 9/2010 | Schechner et al. .............. | 348/81 |

(Continued)

OTHER PUBLICATIONS

"Distance Measuring Based on Stereoscopic Pictures" by; Jernej Mrovlje and Adam Vrancic, 9th. International PhD Workshop on Systems and Control, Oct. 3, 2008, Slovenia.*

(Continued)

*Primary Examiner* — Dave Czekaj
*Assistant Examiner* — Dramos I Kalapodas
(74) *Attorney, Agent, or Firm* — Steven Spellman; Jim Ross; Micky Minhas

(57) ABSTRACT

Visual atmospheric effects, colloquially often referred to as "haze", are filtered from images while taking into account the directional component of such atmospheric effects. A mathematical model, taking into account directional components of light scattering causing the "haze" is utilized to provide more accurate results, especially within the context of wide field images. This mathematical model includes a directional component in the transmission coefficient. To remove the haze from images, each pixel of an individual image can have the atmospheric coloring subtracted from that pixel and can then have an appropriate compensation made for the atmospheric transmission losses. An image capture system collects metadata to aid in the determination of directional components of haze. The removal of haze from images can provide images that can be more easily combined into a composite image.

20 Claims, 4 Drawing Sheets

(56) References Cited

U.S. PATENT DOCUMENTS

| | | | |
|---|---|---|---|
| 8,340,461 B2* | 12/2012 | Sun et al. | 382/275 |
| 8,350,933 B2* | 1/2013 | Fattal | 348/241 |
| 2008/0137206 A1 | 6/2008 | Nakamura et al. | |
| 2009/0097744 A1 | 4/2009 | Schultz et al. | |
| 2010/0040300 A1* | 2/2010 | Kang et al. | 382/255 |
| 2010/0067823 A1 | 3/2010 | Kopf et al. | |
| 2010/0259651 A1 | 10/2010 | Fattal | |
| 2010/0322480 A1* | 12/2010 | Banerjee et al. | 382/103 |
| 2011/0018990 A1* | 1/2011 | Komoto et al. | 348/116 |
| 2011/0216953 A1* | 9/2011 | Callahan et al. | 382/128 |
| 2011/0228074 A1* | 9/2011 | Parulski et al. | 348/81 |
| 2012/0154584 A1 | 6/2012 | Omer et al. | |
| 2012/0194649 A1* | 8/2012 | Javidi et al. | 348/47 |
| 2012/0212477 A1* | 8/2012 | Grindstaff et al. | 345/419 |

OTHER PUBLICATIONS

"Single Image Haze Removal Using Dark Channel Prior", He Kaiming, Chinese University of Hong Kong, Aug. 2011.*

"Measuring Atmospheric Scattering From Digital Images of Urban Scenery Using Temporal Polarization-Based Vision", by Tarek Ei-Gaaly, The American University in Cairo, 2009.*

Fattal, Raanan, "Single Image Dehazing", Retrieved at <<http://www.cs.huji.ac.il/~raananf/papers/defog.pdf>>, Journal of ACM Transactions on Graphics, 2008, p. 9.

He, et al., "Single Image Haze Removal Using Dark Channel Prior", Retrieved at <<http://mmlab.ie.cuhk.edu.hk/cvpr2009/cvpr09dehaze.pdf>>, IEEE Conference on Computer Vision and Pattern Recognition, Jun. 2009, pp. 1956-1963.

* cited by examiner

REMOVAL OF RAYLEIGH SCATTERING FROM IMAGES

BACKGROUND

When stitching together individual images to create a composite, it is generally desirable to remove variances in appearance between the individual images since such variances become more noticeable when the individual images are placed one right next to the other. For example, two images of adjacent portions of an object, such as a large building or a scene, such as the Grand Canyon, can have a slight variation in coloring with, as an example, one image having a slightly more orange hue than another. While such a variation can be difficult for viewers to see when viewing the images serially, when the images are placed immediately adjacent to one another to create a composite image of the object or scene, such a slight difference can be readily apparent and noticeable and can define and emphasize a boundary between the two individual images that was meant to be obfuscated by their joining to create the composite.

The above-described effect can be especially noticeable, and even distracting, when a composite image comprises hundreds, thousands, or even more, individual images. For example, modern computing-device-implemented maps, including maps accessed through network communications and maps accessed from a local storage medium, such as an optical disc, often provide for pictorial representations of the areas encompassed by maps. Such pictorial representations are typically comprised of many thousands of individual images, often taken from above, such as by an airplane or a satellite. For individual images acquired by airplane, the atmosphere often adds visible discolorations or effects to the images. Colloquially, such atmospheric interference is referred to as "haze" and results in images that are not as clear, and do not have as high contrast, as they otherwise could. To eliminate such haze, and provide a common visual baseline for all of the individual images that will be combined to generate the composite image to be utilized as part of the computing-device-implemented map, a model has been created to define the perceived illumination of a pixel in an image as a combination of the illumination of the object, taking into account transmission losses between the object and the camera taking the picture, and the visual effects added by the atmosphere.

Even outside of the context of stitching together images, it is generally desirable to remove atmospheric effects from images. For example, any image should appear more clear and the coloring of such an image should appear more accurate, if atmospheric effects are removed. Thus, the above-described drawbacks to atmospheric effects in images are not limited to the stitching together of images into a composite image.

One commonly utilized formula to model the perceived illumination of a pixel in an image is $I_x = J_x T_x + A \cdot (1 - T_x)$, where $I_x$ is the color of the pixel, $J_x$ is the surface radiance vector, at the object represented by the pixel, that corresponds to the pixel, $T_x$ is the transmission along the ray of light between the object represented by the pixel and the camera that captured the image that includes the pixel, and A is the atmospheric color coefficient, which, as will be recognized by those skilled in the art, is typically a constant for the entire image. $T_x$ has a value of between 0 and 1, such that a value of 0 represents an object that is so far away that none of the light bouncing off of that object reaches the camera, and is, instead, all scattered by atmospheric particles between the object and the camera, and a value of 1 represents an object that is so close that all of the light bouncing off of that object reaches the camera, and none of it is scattered by any intervening atmospheric particles.

Traditionally, the transmission coefficient is modeled by the equation $T_x = e^{-\beta D_x}$, where $\beta$ is the atmospheric scattering coefficient, which, like A above, is also constant for the entire image, and $D_x$ is the scene depth at the pixel, or, stated differently, the distance between the camera and the object that corresponds to the pixel. Unfortunately, such a model is only accurate for narrow field images and does not include, or provide for, the directional aspects of atmospheric interference. Thus, such a model does not provide acceptable results when implemented on wide field images, such as, for example, those taken by an airplane for purposes of generating a composite image for mapping purposes. Similarly, such a model does not provide optimal results when images are captured at oblique angles. For example, certain satellites are designed to capture oblique images, such as for stereo reconstruction purposes. Utilizing the above-described model would provide sub-optimal results on such images.

SUMMARY

In one embodiment, a directional component can be added to the modeling of the transmission coefficient to provide greater accuracy when modeling atmospheric effects in wide field images.

In another embodiment, the transmission coefficient can be modeled by the equation, $T_x = e^{-\beta(1 + \cos^2 \theta) D_x}$ where $\theta$ is the angle between the object that corresponds to the pixel and the camera that captured the image of which that pixel is a part. In such a manner, a directional component can be added to the modeling of the transmission coefficient.

In a further embodiment, visual atmospheric effects, or "haze", can be removed from individual images utilizing the transmission coefficient having a directional component. Initially, a pixel's color and intensity values can be adjusted by removing atmospheric color. Subsequently, a pixel's color and intensity values can be adjusted by removing atmospheric transmission losses.

In a still further embodiment, image metadata can be utilized to identify the distance between a physical object represented by a given pixel in an image into the camera that captured that image. Image metadata can also be utilized to identify the angle between the physical object represented by a given pixel and the camera.

In a yet further embodiment, an image capturing system can include instruments capable of directly measuring the distance between the physical object represented by a selected pixel in an image and the camera capturing that image, and also the angle between that object and the camera.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
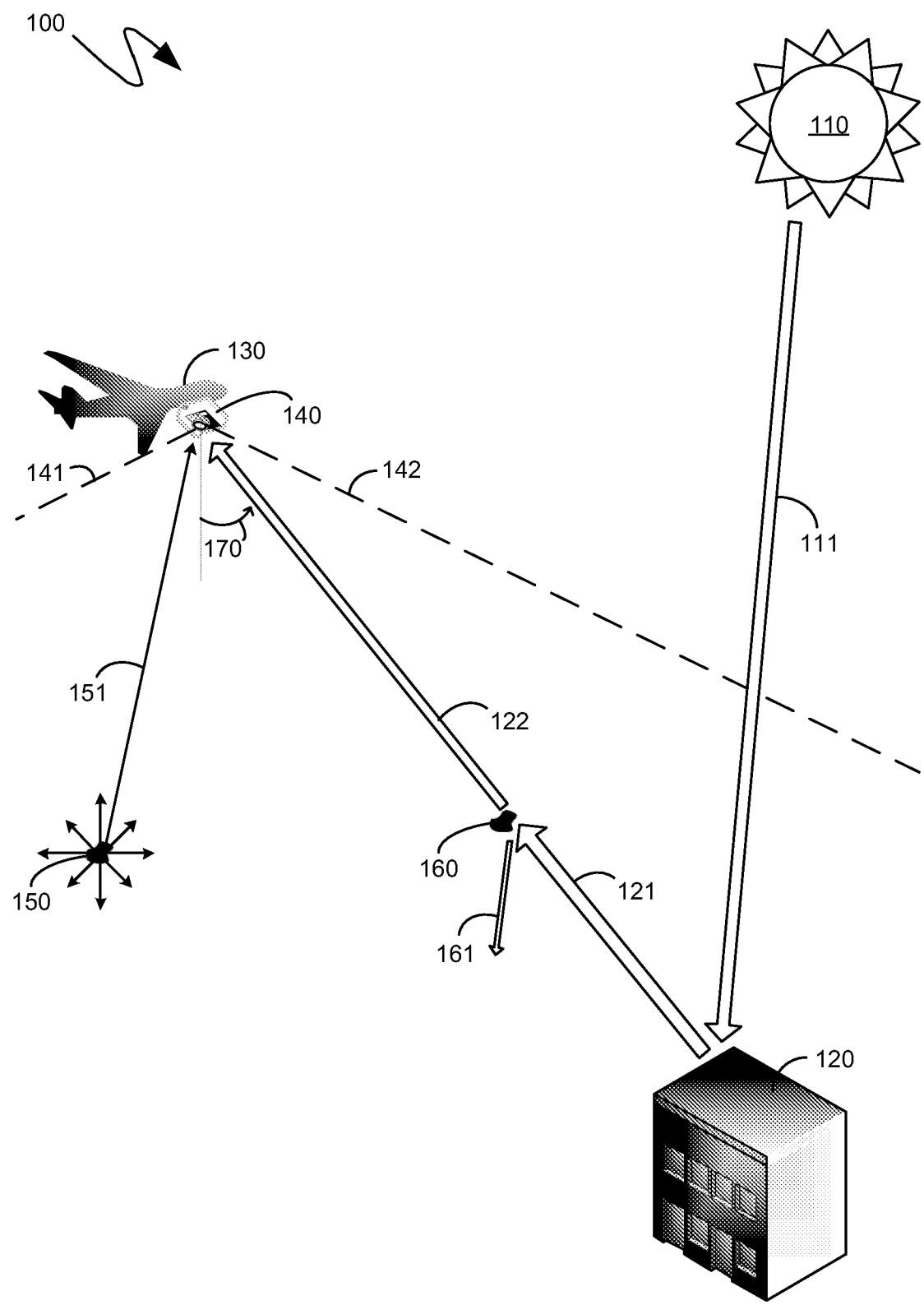
FIG. 1 is a block diagram of an exemplary context within which images with haze are generated.

The following description relates to mechanisms for filtering out visual atmospheric effects, colloquially often referred to as "haze", from images. Such haze is the result of Rayleigh scattering of light by particles in the atmosphere and, consequently, is based on direction. A mathematical model, taking into account such a directional component, can be utilized to provide more accurate results, especially within the context of wide field images. The mathematical model can define a current value of a pixel as a function of what the value of that pixel would have been were it not for atmospheric transmission losses between the object represented by that pixel and the camera that captured the image and as a function of the atmospheric coloring. To remove the haze from images, each pixel of an individual image can have the atmospheric coloring subtracted from that pixel and can then have an appropriate compensation made for the atmospheric transmission losses. To accommodate the directional aspects of Rayleigh scattering that are accounted for in the mathematical model, a camera, or image capturing system, can collect metadata such as the angle of the sun, or other light source, with respect to the camera, the angle between the camera and objects within its frame, the distance between the camera and objects within its frame, and other like metadata. Such metadata can be acquired indirectly, such as by being derived from other metadata, such as the time of day, the positional location of the camera, or from other existing data such as a digital elevation model of the area being photographed. Alternatively, or in addition, such metadata can be acquired directly by sensors that are part of the image capture system, or otherwise work in coordination with the camera. The removal of haze from images can provide for images that can be more easily combined, or stitched together, into a composite image.

For purposes of illustration, the techniques described herein make reference to a typical scenario, namely the removal of haze from individual images obtained by an airplane mounted camera that takes pictures of the ground for purposes of stitching together those individual images into a composite geographic image, such as would typically be utilized by, or provided by, computing-device-implemented maps. Such references, however, are strictly exemplary and are not intended to limit the mechanisms described to the specific examples provided. Indeed, the techniques described are applicable to any set of individual images where it is desirable to normalize the individual images, such as by removing haze, or other like atmospheric visual effects that can vary from image to image, to reduce the visual discrepancies between the individual images, which can be especially noticeable when the individual images are placed in close proximity to one another, such as, for example, when the individual images are stitched together to form a composite image.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary system 100 is shown, comprising, as an example, a camera 140, or other image-capturing apparatus, mounted on an airplane 130, or other craft that can travel at sufficiently high altitudes above the ground to capture downward facing images of the ground. The camera 140 can comprise the capability to capture images that have a wide field of view, and such a capability is illustrated by the system 100 of FIG. 1 via the dashed lines 141 and 142 that can delineate the field of view captured by the camera 140. As will be recognized by those skilled in the art, images of objects within the field of view of a camera 140, such as the building 120, can be captured by the camera when light reflects off of those objects and reaches the camera. Between the camera 140 and the objects of which it is taking pictures, such as the building 120, can be the atmosphere which, as will also be known to those skilled in the art, can comprise small particulates that can reflect and redirect light in a myriad of directions.

For purposes of the following descriptions, the light source will be assumed to be the sun, although other light sources can be used with the mechanisms described herein. Thus, within the context of the system 100 of FIG. 1, the referenced light will be assumed to have been generated by the sun 110. As such, particles in the atmosphere, such as the exemplary particle 150, can reflect the sunlight provided by the sun 110 in, essentially, all directions, as illustrated by the arrows diverging from the particle 150. One direction in which the atmospheric particle 150 can redirect sunlight from the sun 110 is illustrated via the arrow 151. In particular, as shown by the arrow 151, particles in the atmosphere, such as the atmospheric particle 150, can redirect sunlight into the camera 140, thereby adding atmospheric color to the images captured by the camera 140.

In addition to adding atmospheric color to the images captured by the camera 140, particles in the atmosphere can also introduce transmission losses in the form of light that is reflected off of an object, such as the building 120, but that does not ultimately reach the camera 140, thereby making the object appear dimmer or less clear in the image captured by the camera 140. For example, as illustrated by the system 100 of FIG. 1, a ray of sunlight from the sun 110, in the form of the arrow 111 can strike an object, such as the building 120, and can be redirected towards the camera 140, thereby enabling the camera to capture an image of that object. For purposes of illustration, the redirected sunlight that is reflected off of the building 120, towards the camera 140, is illustrated in FIG. 1 as the arrow 121. But, as illustrated, the light reflected off of the building 120, and directed towards the camera 140, illustrated by the arrow 121, can, strike multiple atmospheric particles, such as the atmospheric particle 160, and can, itself, be reflected and redirected off of those particles such that only a portion of the light that was originally heading to the camera 140 can ultimately reach the camera, thereby making the object appear dimmer and less clear. This redirection of the reflected light is illustrated by the arrow 161, while the light proceeding to the camera 140, as illustrated by the arrow 122, has less magnitude than the light originally reflected off of the building 120, which was illustrated with the arrow 121, and is graphically shown by the fact that the thickness of the arrow 122 is less than the thickness of the arrow 121.

The addition of atmospheric coloring and atmospheric transmission losses to a picture, such as would be taken by the camera 140, is modeled by the equation $I_x = J_x T_x + A \cdot (1 - T_x)$. In this equation, $I_x$ is the color of a pixel, or other defined subsection, of an image taken by the camera 140, such as the color of a pixel representing some portion of the building 120. $J_x$ is the surface radiance vector that corresponds to that pixel, as that radiance vector exists at the object, such as the building 120. Within the terms of the system 100, illustrated in FIG. 1, $J_x$ is the radiance vector at the start of the arrow 121, representing the light from the sun 110 that is bouncing off of the building 120 and being captured by the camera 140 to generate the image. $T_x$ is the transmission along the ray of light between the object represented by the pixel, such as the building 120 and the camera 140. And A is the atmospheric color coefficient, which, as will be recognized by those skilled in the art, is typically a constant for the entire image. For ease of reference, and clarity of description, the descriptions below are provided within the context of per-pixel processing. However, as will be recognized by those skilled in the art, the descriptions below are equally applicable, without change, to the processing of any quanta, or subsections, of an image, so long as that quantum or subsection is treated as an indivisible element for purposes of the processing described. Thus, references to "pixels" below include any quantum or subsection, irrespective of how many image pixels such a subsection comprises, subject to the above caveat.

In the equation $I_x = J_x T_x + A \cdot (1 - T_x)$, the first term, $J_x T_x$, can represent the transmission losses caused by the atmospheric particles that were described above and illustrated in the system 100 of FIG. 1. The second term, $A \cdot (1 - T_x)$ can represent the atmospheric color that is added by the reflections of sunlight off of atmospheric particles, which was also described above and illustrated in the system 100 of FIG. 1.

The transmission coefficient, $T_x$, has a value of between 0 and 1, such that a value of 0 represents an object that is so far away that none of the light bouncing off of that object reaches the camera, and is, instead, all scattered by atmospheric particles between the object and the camera, and a value of 1 represents an object that is so close that all of the light bouncing off of that object reaches the camera, and none of it is scattered by any intervening atmospheric particles. Traditionally, the transmission coefficient is modeled by the equation $T_x = e^{-\beta D_x}$, where $\beta$ is the atmospheric scattering coefficient, which, like A above, is also constant for the entire image, and $D_x$ is the scene depth at the pixel, or, stated differently, the distance between the camera and the object that corresponds to the pixel, such as, for example, the building 120 in the system 100 of FIG. 1. The constant "e" is sometimes referred to as "Euler's number" or "Euler's constant" and, rounded to three decimal places, is 2.718. Unfortunately, such a model is only accurate for narrow field images and does not include, or provide for, the directional aspects of atmospheric interference. Thus, such a model does not provide acceptable results when implemented on wide field images, such as, for example, those taken by the camera 140 illustrated in FIG. 1 and described in detail above.

To account for the directional aspects of atmospheric interference, a $1 + \cos^2 \theta$ term can be added to the transmission coefficient model, yielding a new, directional transmission coefficient model where the transmission coefficient is modeled as: $T_x = e^{-\beta(1 + \cos^2 \theta) D_x}$. In such a new, directional transmission coefficient model, $\theta$ can represent the angle between the object whose picture is being taken, such as the building 120 in the illustrated system 100 of FIG. 1, and the camera, such as the camera 140 of FIG. 1. In atmospheric studies, Rayleigh scattering, or the scattering of light, such as sunlight, by atmospheric particles is modeled as $$I = I_0 \left( \frac{8\pi^4 N \alpha^2}{\lambda^4 R^2} \right)(1 + \cos^2 \theta),$$

where the $$\frac{8\pi^4 N \alpha^2}{\lambda^4 R^2}$$

term is dependent upon atmospheric conditions, and the $1 + \cos^2 \theta$ term is the directional component. Thus, it is this directional component that can be added to the transmission coefficient model to yield the new, directional transmission coefficient model.

In one embodiment, the imaging system that comprises the camera that is taking the pictures can also comprise mechanisms and equipment to directly measure the angle between the camera and the item being photographed, such as the angle between the camera 140 and the building 120, illustrated as the angle 170 in the system 100 of FIG. 1. In another embodiment, the imaging system that comprises the camera, such as the camera 140, can also comprise mechanisms and equipment to directly measure other angles, from which the angle between the camera and the item being photographed, such as the angle 170, can be derived. For example, in such another embodiment, the imaging system can comprise mechanisms and equipment to directly measure the angle of the sun 110 with respect to the camera 140 at the time that the camera is taking a picture. In yet another embodiment, the imaging system that comprises the camera, such as the camera 140, can comprise mechanisms and equipment to record data from which the angle between the camera and the item being photographed, such as the angle 170, can be derived. Such data can include, for example, the time of day at which the picture was taken, the exact geographic position of the camera 140 that is taking the picture, the angle of the camera's field of view, the height of the airplane 130 above the ground, and other like data. The data acquired by the imaging system, whether data that directly records the angle 170, or data from which angle 170 can be derived, can be stored as metadata to the image taken by the camera 140 and can subsequently be utilized, as will be described in further detail below, to aid in the removal of the atmospheric effects or "haze" from the images taken by the camera 140.

Figure 2:
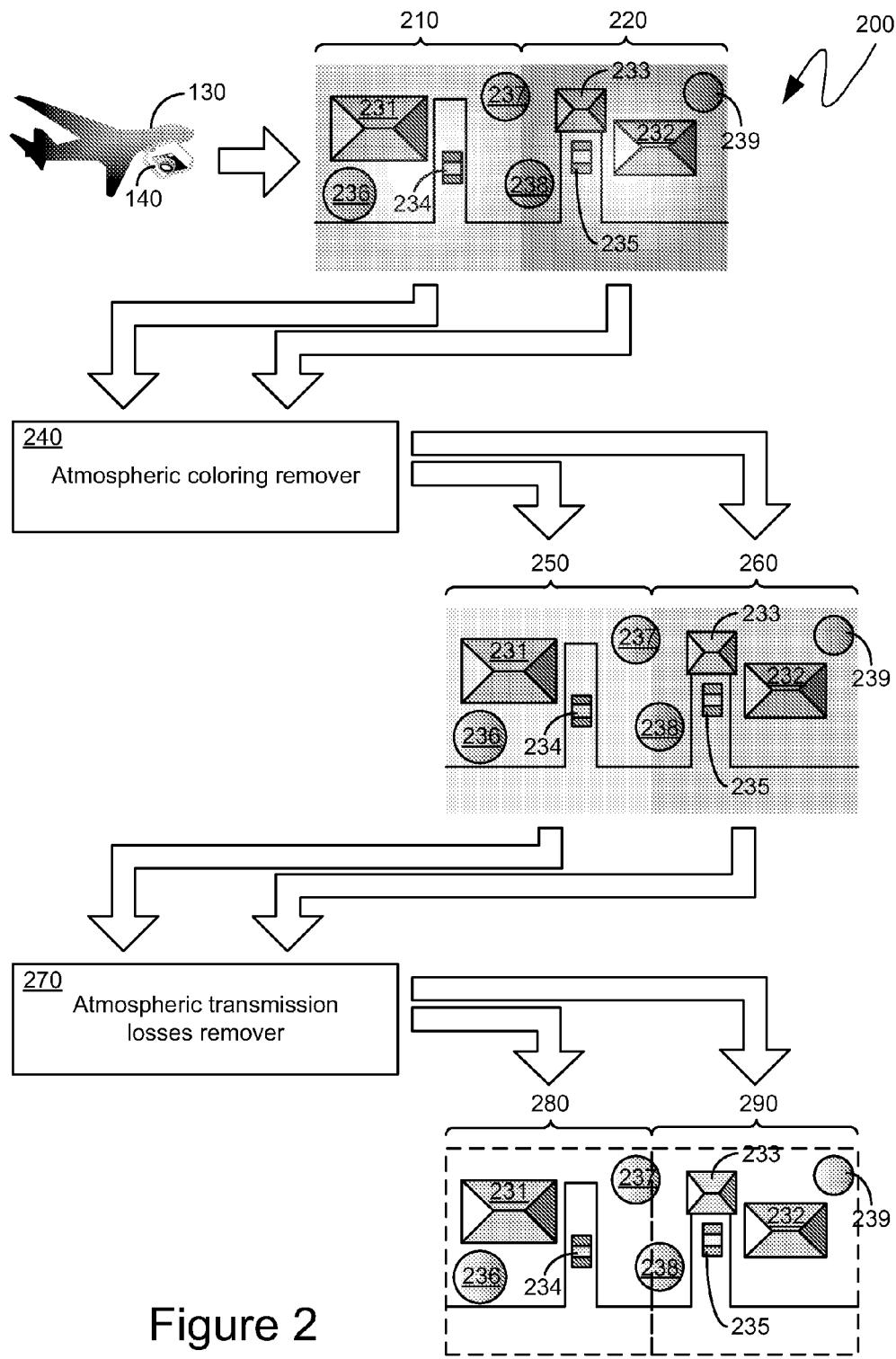
FIG. 2 is a block diagram of an exemplary system for filtering out the haze from images.

Turning to FIG. 2, the system 200 shown therein illustrates an exemplary system that can remove the haze, or other atmospheric effects, from the images taken by the camera 140 so as to be able to combine, or "stitch together", those images into a composite image without visible demarcations illustrating the boundaries of the individual photographs that are being combined to form the composite image. As will be recognized by those skilled in the art, while the system 200 is shown as removing atmospheric effects from images for the purpose of stitching those images together, there can exist other reasons for seeking to remove such atmospheric effects from images and the techniques described herein are equally applicable to any such reasons.

Initially, as shown by the system 200 of FIG. 2, the camera 140 can have taken individual images, such as the images 210 and 220. For example, the images 210 and 220 can be acquired from the camera 140 in a traditional manner after the airplane 130 has returned to the ground. To illustrate the mechanisms contemplated, the exemplary images 210 and 220 are shown as comprising several objects as seen from above including, for example, houses 231 and 232, a detached garage 233, vehicles 234 and 235 and trees 236, 237, 238 and 239.

In one embodiment, images from the camera 140, such as the images 210 and 220, can first be provided to an atmospheric coloring remover 240 that can apply graphical filtering to the images, such as the images 210 and 220, to remove the atmospheric coloring that was added to those images, such as by the scattering of light by atmospheric particles in the manner described in detail above. As indicated previously, the color of each pixel in the images received by the atmospheric coloring remover 240, such as the images 210 and 220, can be modeled by the equation $I_x = J_x T_x + A \cdot (1-T_x)$. Thus, to remove the atmospheric coloring, the atmospheric coloring remover 240 can take the initial color of each pixel in the images it receives, such as the images 210 and 220, and can "subtract" from that value the atmospheric coloring that is represented by the term "$A \cdot (1-T_x)$" in the above equation. Mathematically, the atmospheric coloring remover 240 can, for each pixel in the images it receives, such as the images 210 and 220, perform the following function: $I_x - A \cdot (1-T_x)$, where, as indicated previously, $I_x$ is the color of the pixel as the image is received by the atmospheric coloring remover 240, A is the atmospheric color and is constant for the entire image that is currently being processed by the atmospheric coloring remover 240 and $T_x$ is the transmission along the ray of light between the object represented by the pixel and the camera 140 and is modeled by the new, directional transmission coefficient model: $T_x = e^{-\beta(1+\cos^2 \theta)D_x}$, where, again, $\beta$ is the atmospheric scattering coefficient, which, like A above, is constant for the entire image, $D_x$ is the distance between the camera and the object that corresponds to the pixel, and $\theta$ is the angle between the camera and the object corresponding to the pixel being operated on by the atmospheric coloring remover 240. Mechanisms for estimating values for A and $\beta$ are well known to those skilled in the art. Such mechanisms are equally applicable to the processing described herein, despite the utilization of directional models.

The atmospheric coloring remover 240 can receive, in addition to the images from the camera 140, such as the images 210 and 220 shown in the system 200 of FIG. 2, metadata associated with those images from which the atmospheric coloring remover can obtain the angle between the camera 140 and the objects corresponding to the individual pixels of the images on which the atmospheric coloring remover will be performing the above-described operations. For example, such an angle can be directly stored in the metadata associated with the images received by the atmospheric coloring remover 240, or, alternatively, such an angle can be derived by the atmospheric coloring remover 240 from other metadata associated with those images, such as, for example, the angle of the sun at the time that the pictures were taken, or the exact time and location at which the pictures were taken.

Additionally, the metadata associated with the pictures, that can be received by the atmospheric coloring remover 240, can also include information regarding the distance between the camera and the objects corresponding to the individual pixels of the images on which the atmospheric coloring remover 240 will be performing the above-described operations. For example, the received metadata can comprise data that directly indicates the distance from the camera 140 to the objects, or to a common delineation, such as the distance between the camera 140 and the ground. Alternatively, the received metadata can comprise data from which the distance between the camera 140 and the objects can be derived such as, for example, data regarding the exact location of the camera that can then be utilized, with reference to geographic data, or other like information, to determine the distance between the camera 140 and the ground. Similarly, reference can be made to a digital elevation model of the area being imaged or photographed such that the distance between the camera and the objects represented by one or more pixels in the image can even be pre-computed.

With such information, the atmospheric coloring remover 240 can change the colors of the individual pixels of the images it receives, such as the images 210 and 220, to remove, or filter out, the coloring added by the scattering of light of atmospheric particulates. In particular, and as indicated previously, the atmospheric coloring remover 240 can subtract $A \cdot (1-T_x)$ from the color value of the pixel on which it is currently operating, where $T_x$ is, as before, given by the formula $e^{-\beta(1+\cos^2 \theta)D_x}$, where $\beta$, the atmospheric scattering coefficient, can be pre-provided to the atmospheric coloring remover 240, or can be downloaded, or otherwise obtained, by the atmospheric coloring remover 240 as needed, and $D_x$ and $\theta$ can be derived from the metadata of the image, as described in detail above.

The resulting images, such as the images 250 and 260, can have the atmospheric coloring removed, but can still have the transmission losses inflicted by atmospheric particles, such as in the manner described in detail above. To illustrate such, the images 250 and 260 of the system 200 of FIG. 2 are shown as having a consistent gray shading, as opposed to the gradient, darker gray shading of the original images 210 and 220, which was intended to illustrate the combination of both the transmission losses and the atmospheric coloring. Images 250 and 260 can then be provided to an atmospheric transmission losses remover 270 to remove, or "filter out", these transmission losses that can be caused by the atmospheric particles, such as in the manner described in detail above.

In one embodiment, the atmospheric transmission losses remover 270 can operate on a per-pixel basis, like the atmospheric coloring remover 240 that was described in detail above. More specifically, for each pixel in an image that the atmospheric transmission losses remover 270 receives, such as, for example, the images 250 and 260, the atmospheric transmission losses remover 270 can increase the intensity of that pixel by an amount equivalent to the directional transmission coefficient given above. Mathematically, for each pixel, the atmospheric transmission losses remover 270 can perform the following function:

$$\frac{I_x}{T_x} = J_x,$$

where, as before, $I_x$ is the color of the pixel as the image is received by the atmospheric transmission losses remover 240 and $T_x$ is the transmission along the ray of light between the object represented by the pixel and the camera 140 and is modeled by the new, directional transmission coefficient model: $T_x = e^{-\beta(1+\cos^2\theta)D_x}$.

The atmospheric transmission losses remover 270 can, like the atmospheric coloring remover 240, determine the directional transmission coefficient, $T_x$, for each pixel based on the metadata provided with each image. For example, the atmospheric transmission losses remover 270 can, from the metadata, obtain or derive the distance between the camera and the object that corresponds to the pixel and thereby obtain $D_x$, and, also from the metadata, the atmospheric transmission losses remover 270 can obtain or derive the angle $\theta$ between the camera and the object that corresponds to the pixel. With such information, the atmospheric transmission losses remover 270 can derive the directional transmission coefficient and can, thereby, modify the color of each pixel by dividing it with that directional transmission coefficient, thereby removing the atmospheric transmission losses from images provided to it.

The resulting images 280 and 290 are shown in the system 200 of FIG. 2 as not having any shading to illustrate that they are normalized images after removal of atmospheric coloring and atmospheric transmission losses. Thus, as also illustrated by the system 200 of FIG. 2, the images 280 and 290 can be joined together to form a composite image that does not comprise the clear delineations between the individual images 280 and 290 as did the composite image formed from the individual images 210 and 220. Additionally, while the atmospheric coloring remover 240 and the atmospheric transmission losses remover 270 have been illustrated, and described, as separate components, it can be desirable that they be combined as a single component that would receive the initial, individual images 210 and 220 and generate the normalized images 280 and 290.

Figure 3:
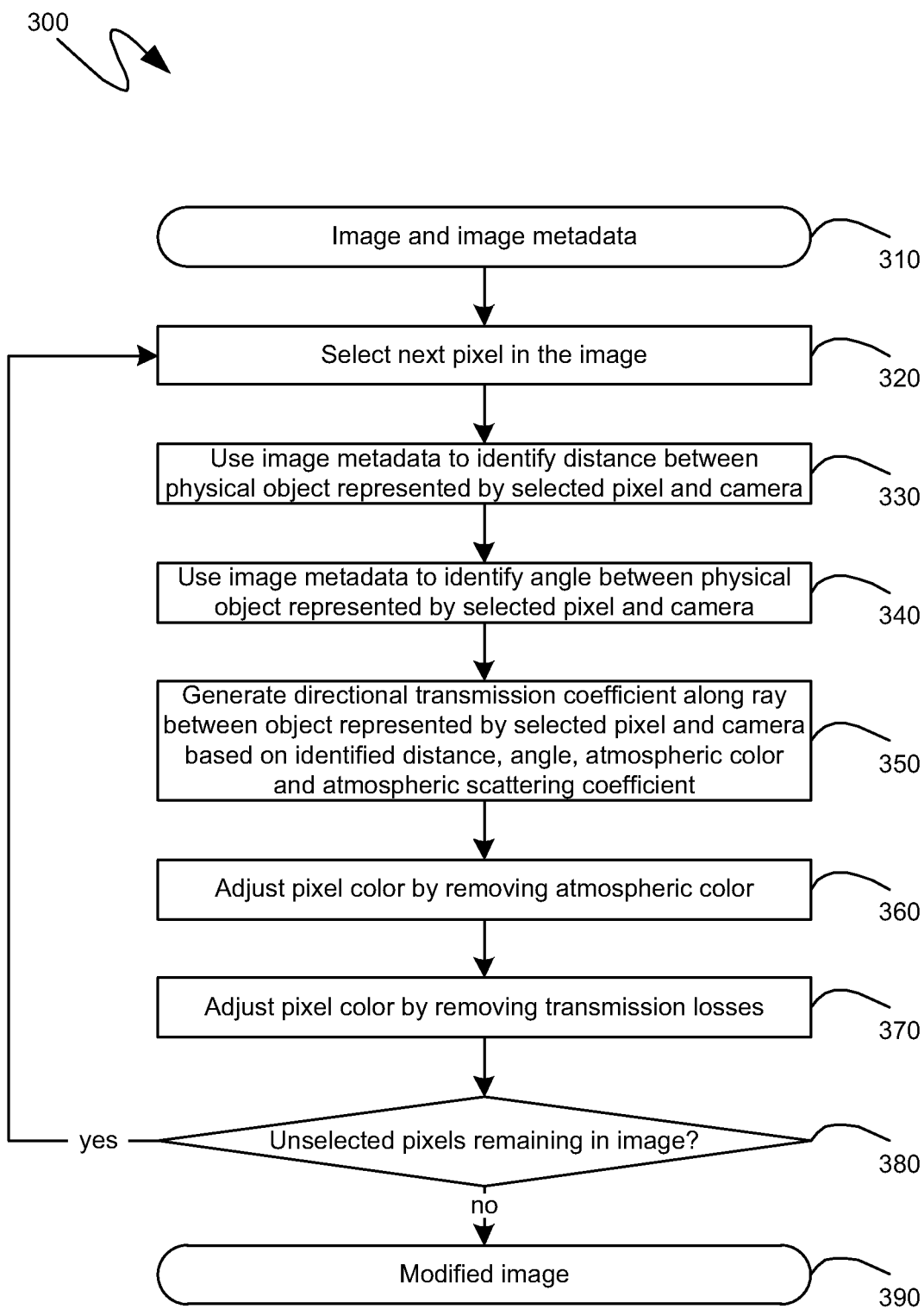
FIG. 3 is a flow diagram of an exemplary system for filtering out the haze from images.

Turning to FIG. 3, the flow diagram 300 shown therein illustrates an exemplary series of steps that could be performed, either by such a singular component, or by individual components, such as were illustrated by the system 200 of FIG. 2. Initially, as shown by the step 310, an individual image and associated metadata can be received. Subsequently, at step 320, a pixel in that image can be selected. At step 330, the metadata that was received at step 310 can be utilized to identify a distance between the physical object that is represented by the pixel, which was selected at step 320, and the camera that captured the image, which was received at step 310. As described previously, the metadata can comprise information, such as a distance from the ground at which the image was taken. Such information can be utilized in combination with the offset, within the image, of the pixel selected at step 320, to calculate, at step 330, a distance between the physical object that is represented by that selected pixel and the camera. Similarly, at step 340, image metadata, received at step 310, can be utilized to identify the angle between the physical object that is represented by the pixel, which was selected at step 320, and the camera. As also indicated previously, metadata can comprise information from which such an angle can be either obtained directly or derived. For example, the metadata can comprise information regarding the angle of the sun at the time that the image, received at step 310, was taken, thereby enabling the derivation of the angle between the physical object represented by the selected pixel in the camera, such as in the manner described in detail above. Alternatively, the metadata, received at step 310, can comprise direct angular measurements from which the angle identified at step 340 can be directly obtained.

With the distance identified at step 330 and the angle identified at step 340, processing can proceed to step 350 where the directional transmission coefficient along the way between the object represented by the pixel, which was selected at step 320, and the camera, which took the image that was received at step 310, can be generated. More specifically and as described in detail above, such a directional transmission coefficient can be generated via the formula $T_x = e^{-\beta(1+\cos^2\theta)D_x}$, where, $\beta$ is the atmospheric scattering coefficient, which is constant for the entire image, $D_x$ is the distance that was obtained at step 330 and $\theta$ is the angle that was obtained at step 340. Once the directional transmission coefficient has been generated, at step 350, processing can proceed to step 360, where the color of the pixel, which was selected at step 320, can be adjusted by removing the atmospheric color. As indicated previously, in one embodiment, the adjustment of the pixel color, at step 360, can be performed by subtracting $A \cdot (1-T_x)$ from the value of the pixel as selected at step 320, where A is the atmospheric color that can be obtained or derived in a manner well known to those skilled in the art, and $T_x$ is the directional transmission coefficient that was obtained at step 350. Similarly, at step 370, the pixel color of the pixel selected at step 320 and after being processed at step 360, can be further adjusted to remove transmission losses. As indicated previously, in one embodiment, the adjustment of the pixel color, at step 370, can be performed by dividing the value of the pixel, as it exists after the performance of step 360, by the directional transmission coefficient, namely $T_x$, which was obtained at step 350.

The resulting pixel value can then be a normalized pixel value that accounts for, and removes, the effects of atmospheric color and atmospheric transmission losses. Processing can then proceed to determine whether there are additional pixels remaining in the image, which was received at step 310, that have not previously been processed. If, at step 380, it is determined that there are no such remaining pixels, then processing can end at step 390 and the resulting image can be a modified, or "normalized", image. Conversely, if, at step 380, it is determined that additional pixels remain in the image, which was received at step 310, that have not already been processed, then processing can return to step 320 and the next pixel remaining to be processed can be selected. In such a manner an image can be processed to undo, or remove, the effects of atmospheric coloring and atmospheric transmission losses.

Figure 4:
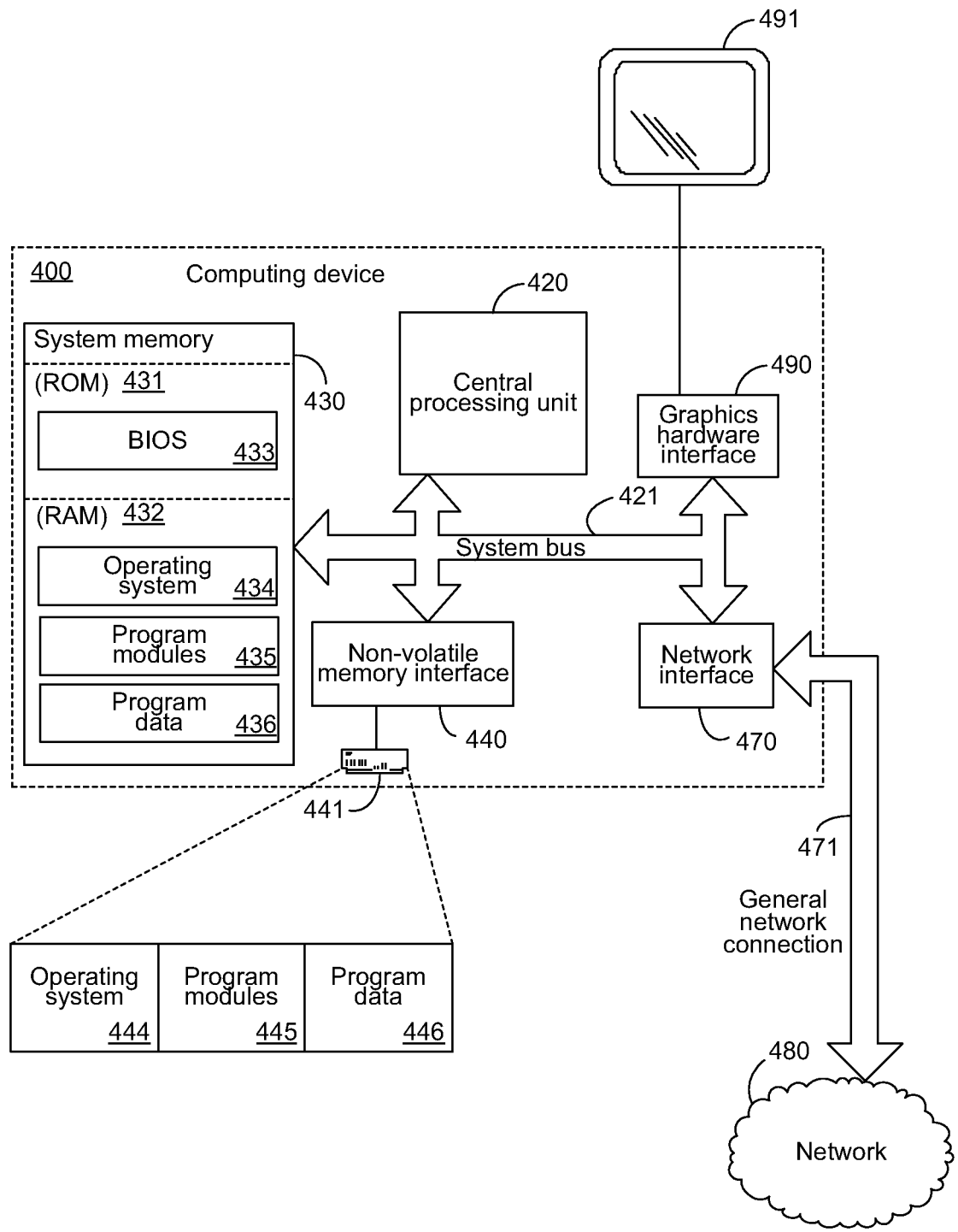
FIG. 4 is a block diagram of an exemplary computing device.

Turning to FIG. 4, an exemplary computing device 400 is illustrated. The exemplary computing device 400 can be a computing device that can comprise the above-described atmospheric coloring remover 240 and atmospheric transmission losses remover 270, shown in FIG. 2. The exemplary computing device 400 of FIG. 4 can include, but is not limited to, one or more central processing units (CPUs) 420, a system memory 430, that can include RAM 432, and a system bus 421 that couples various system components including the system memory to the processing unit 420. The system bus 421 may be any of several types of bus structures including a memory bus or memory controller, a peripheral bus, and a local bus using any of a variety of bus architectures. The computing device 400 can optionally include graphics hardware, such as for the display of visual user interfaces, including, but not limited to, a graphics hardware interface 490 and a display device 491. Depending on the specific physical implementation, one or more of the CPUs 420, the system memory 430 and other components of the computing device 400 can be physically co-located, such as on a single chip. In such a case, some or all of the system bus 421 can be nothing more than silicon pathways within a single chip structure and its illustration in FIG. 4 can be nothing more than notational convenience for the purpose of illustration.

The computing device 400 also typically includes computer readable media, which can include any available media that can be accessed by computing device 400 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 400. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 431 and the aforementioned RAM 432. A basic input/output system 433 (BIOS), containing the basic routines that help to transfer information between elements within computing device 400, such as during start-up, is typically stored in ROM 431. RAM 432 typically contains data and/or program modules that are immediately accessible to and/or presently being operated on by processing unit 420. By way of example, and not limitation, FIG. 4 illustrates the operating system 434 along with other program modules 435, and program data 436.

The computing device 400 may also include other removable/non-removable, volatile/nonvolatile computer storage media. By way of example only, FIG. 4 illustrates the hard disk drive 441 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440.

The drives and their associated computer storage media discussed above and illustrated in FIG. 4, provide storage of computer readable instructions, data structures, program modules and other data for the computing device 400. In FIG. 4, for example, hard disk drive 441 is illustrated as storing operating system 444, other program modules 445, and program data 446. Note that these components can either be the same as or different from operating system 434, other program modules 435 and program data 436. Operating system 444, other program modules 445 and program data 446 are given different numbers hereto illustrate that, at a minimum, they are different copies.

The computing device 400 can operate in a networked environment using logical connections to one or more remote computers. The computing device 400 is illustrated as being connected to the general network connection 471 through a network interface or adapter 470 which is, in turn, connected to the system bus 421. In a networked environment, program modules depicted relative to the computing device 400, or portions or peripherals thereof, may be stored in the memory of one or more other computing devices that are communicatively coupled to the computing device 400 through the general network connection 471. It will be appreciated that the network connections shown are exemplary and other means of establishing a communications link between computing devices may be used.

As can be seen from the above descriptions, mechanisms for removing the effects of atmospheric coloring and atmospheric transmission losses, taking into account the directional components thereof, have been presented. In view of the many possible variations of the subject matter described herein, we claim as our invention all such embodiments as may come within the scope of the following claims and equivalents thereto.

We claim:

1. One or more non-transitory computer-readable storage media comprising computer-executable instructions for generating a modified digital image lacking atmospheric effects present in an original digital image from which the modified digital image is generated, the computer-executable instructions directed to steps comprising:

receiving the original digital image and original image metadata associated with the original digital image, the original image metadata comprising information about a directly measured distance between an image capture device sourcing the original digital image and at least one object represented within the original digital image;

digitally selecting a subsection of the original digital image;

determining, with reference to the directly measured distance, a distance between the image capture device and an object represented by the selected subsection of the original digital image;

determining, with reference to the original image metadata, an angle between the image capture device and the object represented by the selected subsection of the original digital image;

generating a directional transmission coefficient, associated with the selected subsection, with reference to the determined distance, which was determined with reference to the directly measured distance, and the determined angle, the generating being performed independently of initial colors of pixels in the selected subsection of the original digital image;

digitally modifying, by a computing device, the selected subsection of the original digital image to remove the atmospheric effects, the digitally modifying being performed with reference to the generated directional transmission coefficient that is associated with the selected subsection; and generating, on the computing device, the modified digital image with the modified selected subsection.

2. The computer-readable storage media of claim 1, wherein the computer-executable instructions for generating the directional transmission coefficient that is associated with the selected subsection comprise computer-executable instructions for raising Euler's number to a power equal to the negative of a product of: an atmospheric scattering coefficient, the determined distance and a square of a cosine of the determined angle.

3. The computer-readable storage media of claim 1, wherein the computer-executable instructions for modifying the selected subsection comprise computer-executable instructions for removing, from the selected subsection, atmospheric coloring that was added by light reflecting off of atmospheric particles.

4. The computer-readable storage media of claim 3, wherein the computer-executable instructions for removing the atmospheric coloring comprise computer-executable instructions for subtracting, from the selected subsection, a product of an atmospheric color coefficient and one minus the directional transmission coefficient that is associated with the selected subsection.

5. The computer-readable storage media of claim 3, wherein the computer-executable instructions for modifying the selected subsection further comprise computer-executable instructions for removing atmospheric transmission losses from the selected subsection, after the atmospheric coloring has been removed from the selected subsection.

6. The computer-readable storage media of claim 5, wherein the computer-executable instructions for removing the atmospheric transmission losses comprise computer-executable instructions for dividing, after the atmospheric coloring has been removed from the selected subsection, the selected subsection by the directional transmission coefficient.

7. The computer-readable storage media of claim 1, wherein the original image metadata comprises information regarding an angle of a sun with respect to the image capture device.

8. The non-transient computer-readable storage media of claim 1, comprising further computer-executable instructions for digitally combining the modified digital image with a second modified digital image to form a digital composite image, wherein the normalization reduces visible delineations between combined digital images in the digital composite image.

9. A method for generating, on a computing device, a modified digital image lacking atmospheric effects present in an original digital image from which the modified digital image is generated, the method comprising the steps of:
receiving, at the computing device, the original digital image and original image metadata associated with the original digital image, the original image metadata comprising information about a directly measured distance between an image capture device sourcing the original digital image and at least one object represented within the original digital image;
digitally selecting, on the computing device, a subsection of the original digital image;
determining, with reference to the directly measured distance, a distance between the image capture device and an object represented by the selected subsection of the original digital image;
determining, with reference to the original image metadata, an angle between the image capture device and the object represented by the selected subsection of the original digital image;
generating a directional transmission coefficient, associated with the selected subsection, with reference to the determined distance, which was determined with reference to the directly measured distance, and the determined angle, the generating being performed independently of initial colors of pixels in the selected subsection of the original digital image;
digitally modifying, on the computing device, the selected subsection of the original digital image to remove the atmospheric effects, the digitally modifying being performed with reference to the generated directional transmission coefficient that is associated with the selected subsection; and
generating, on the computing device, the modified digital image with the modified selected subsection.

10. The method of claim 9, wherein the generating the directional transmission coefficient that is associated with the selected subsection comprises raising Euler's number to a power equal to the negative of a product of: an atmospheric scattering coefficient, the determined distance and a square of a cosine of the determined angle.

11. The method of claim 9, wherein the modifying the selected subsection comprises removing, from the selected subsection, atmospheric coloring that was added by light reflecting off of atmospheric particles.

12. The method of claim 11, wherein the removing the atmospheric coloring comprises subtracting, from the selected subsection, a product of an atmospheric color coefficient and one minus the directional transmission coefficient that is associated with the selected subsection.

13. The method of claim 11, wherein the modifying the selected subsection further comprises removing atmospheric transmission losses from the selected subsection, after the atmospheric coloring has been removed from the selected subsection.

14. The method of claim 13, wherein the removing the atmospheric transmission losses comprises dividing, after the atmospheric coloring has been removed from the selected subsection, the selected subsection by the directional transmission coefficient.

15. The method of claim 9, wherein the original image metadata comprises information regarding an angle of a sun with respect to the image capture device.

16. The method of claim 9, further comprising the steps of: digitally combining the modified digital image with a second modified digital image to form a composite digital image, wherein the normalization reduces visible delineations between combined digital images in the digital composite image.

17. An image capture system comprising:
an image capture device for capturing original images; and
a metadata storage device for storing original image metadata for each captured original image, the original image metadata comprising information about a directly measured distance between the image capture device and at least one object represented within a captured original image and information from which angles between the image capture device and objects that are represented by subsections of the captured original image can be determined.

18. The image capture system of claim 17 further comprising a sun sensor for detecting an angle between a sun and the image capture device and for storing, on the metadata storage device, the detected second angle.

19. The image capture system of claim 17 further comprising a computing device comprising one or more non-transitory computer-readable media comprising computer-executable instructions directed to steps comprising:
selecting a subsection of the captured original image;

determining, with reference to the directly measured distance, a distance between the image capture device and an object represented by the selected subsection of the captured original image;

determining, with reference to the original image metadata, an angle between the image capture device and the object represented by the selected subsection of the original digital image;

generating a directional transmission coefficient, associated with the selected subsection, with reference to the determined distance, which was determined with reference to the directly measured distance, and the determined angle;

modifying the image, to remove the atmospheric effects, the selected subsection of the captured original image, the modifying being performed with reference to the generated directional transmission coefficient that is associated with the selected subsection;

and generating the modified image with the modified selected subsection.

20. The image capture system of claim 19, wherein the computer-executable instructions for generating the directional transmission coefficient that is associated with the selected subsection comprise computer-executable instructions for raising Euler's number to a power equal to the negative of a product of: an atmospheric scattering coefficient, the determined distance and a square of a cosine of the determined angle.

\* \* \* \* \*